(12) United States Patent
Parks

(10) Patent No.: US 10,448,624 B2
(45) Date of Patent: *Oct. 22, 2019

(54) DEEPWATER FISH RELEASE DEVICE

(71) Applicant: Michael Parks, Slidell, LA (US)

(72) Inventor: Michael Parks, Slidell, LA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/858,601

(22) Filed: Dec. 29, 2017

(65) Prior Publication Data

US 2018/0184633 A1    Jul. 5, 2018

Related U.S. Application Data

(63) Continuation of application No. 14/568,105, filed on Dec. 11, 2014, now Pat. No. 9,872,486.

(60) Provisional application No. 61/980,435, filed on Apr. 16, 2014, provisional application No. 61/915,228, filed on Dec. 12, 2013.

(51) Int. Cl.
| | | |
|---|---|---|
| *A01K 97/00* | (2006.01) | |
| *A01K 83/06* | (2006.01) | |
| *A01K 83/00* | (2006.01) | |
| *A01K 65/00* | (2006.01) | |

(52) U.S. Cl.
CPC .............. *A01K 97/00* (2013.01); *A01K 65/00* (2013.01); *A01K 83/00* (2013.01); *A01K 83/06* (2013.01)

(58) Field of Classification Search
CPC ........ A01K 97/00; A01K 99/00; A01K 83/00; A01K 83/06; A01K 65/00
USPC ............ 43/43.12, 4, 44.2, 44.8, 43.16, 44.9, 43/44.91, 42.36, 43.15, 44.4; 224/103
See application file for complete search history.

(56) References Cited

U.S. PATENT DOCUMENTS

| | | | | |
|---|---|---|---|---|
| 103,645 A | * | 5/1870 | Muscroft | A44C 5/2042 24/598.1 |
| 135,228 A | * | 1/1873 | MacDonald | A41F 15/02 24/366 |
| 312,105 A | * | 2/1885 | Faivre | A01K 91/04 24/373 |

(Continued)

FOREIGN PATENT DOCUMENTS

| | | | |
|---|---|---|---|
| EP | 689764 A1 | * | 1/1996 |
| FR | 2591066 | | 12/1985 |

(Continued)

OTHER PUBLICATIONS

Shelton Fish Descender Webpage (http://www.sheltonproducts.com/SFD.html).

(Continued)

*Primary Examiner* — Darren W Ark
(74) *Attorney, Agent, or Firm* — Garvey, Smith & Nehrbass, Patent Attorneys, L.L.C.; Vanessa M. D'Souza; Charles C. Garvey, Jr.

(57) ABSTRACT

An apparatus for releasing a fish into deep water, comprising a central member having an upper end portion and a lower end portion, a spiral member attached to the central member, the spiral member being spaced away from the central member and having a free end, a plurality of swivels, wherein one of the swivels can be connected the upper end portion of the central member and another of said swivels can be connected to the lower end portion of the central member, and a weight connected to the lower swivel. The device can further provide a weight on the central member that overcomes buoyancy of the fish.

15 Claims, 16 Drawing Sheets

(56) References Cited

U.S. PATENT DOCUMENTS

| | | | | |
|---|---|---|---|---|
| 724,362 A * | 3/1903 | Wilson | A44B 15/00 24/600.4 |
| 1,033,464 A * | 7/1912 | Pomeroy | A01K 91/08 43/42.72 |
| 1,325,530 A * | 12/1919 | Ore | A01K 83/00 24/601.9 |
| 1,407,221 A * | 2/1922 | Reimers | A01K 65/00 211/59.1 |
| 1,742,915 A * | 1/1930 | Smith | A45C 11/323 206/37.5 |
| 1,975,754 A * | 10/1934 | Pflueger | A01K 65/00 224/103 |
| 2,115,493 A * | 4/1938 | Johannes | A01K 83/06 43/44.8 |
| 2,123,598 A * | 7/1938 | Eliason | A01K 83/00 43/42.04 |
| 2,260,923 A * | 10/1941 | Thompson | A01K 83/02 43/34 |
| 2,315,295 A * | 3/1943 | Stogermayr | A01K 91/053 24/131 R |
| 2,316,655 A * | 4/1943 | Voos | A44B 15/00 206/234 |
| 2,359,588 A * | 10/1944 | Shea | A01K 95/00 294/82.34 |
| 2,454,879 A * | 11/1948 | Mattingly | A01K 83/06 43/44.8 |
| 2,470,941 A * | 5/1949 | Orton | A01K 65/00 224/103 |
| 2,480,042 A * | 8/1949 | Nelson | A01K 83/06 43/44.4 |
| 2,482,721 A * | 9/1949 | Sigmundi | A01K 83/00 43/44.2 |
| 2,486,635 A * | 11/1949 | Coats | A01K 85/10 24/601.3 |
| 2,501,210 A * | 3/1950 | Cretin | A01K 83/00 43/43.16 |
| 2,511,696 A * | 6/1950 | Clapp | A01K 65/00 224/103 |
| 2,513,548 A * | 7/1950 | Buss | A01K 83/02 43/44.8 |
| 2,517,761 A * | 8/1950 | Boyer | A01K 65/00 224/103 |
| 2,563,160 A * | 8/1951 | Damon | A01K 65/00 224/103 |
| 2,574,846 A * | 11/1951 | Scheidt | A01K 65/00 224/103 |
| 2,599,684 A * | 6/1952 | Bakken | A01K 83/00 43/42.24 |
| 2,602,257 A * | 7/1952 | Morgan | A01K 83/06 43/44.4 |
| 2,636,306 A * | 4/1953 | Sokolik | A01K 83/06 43/44.4 |
| 2,662,257 A * | 12/1953 | Milan | A01K 65/00 224/103 |
| 2,680,928 A * | 6/1954 | Silva | A01K 95/00 43/43.12 |
| 2,700,242 A * | 1/1955 | Porth | A01K 83/06 43/42.47 |
| 2,738,562 A * | 3/1956 | Sharps | A01K 65/00 224/103 |
| 2,755,593 A * | 7/1956 | Thurman | A01K 83/06 43/42.13 |
| 2,922,247 A * | 1/1960 | Buss | A01K 83/00 43/44.8 |
| 2,938,296 A * | 5/1960 | Kracht | A01K 83/00 43/43.16 |
| 2,994,622 A * | 8/1961 | Miller | A01K 95/00 177/226 |
| 3,034,250 A * | 5/1962 | Laba | A01K 83/06 43/42.37 |
| 3,057,108 A * | 10/1962 | Jacobsen | A01K 95/00 43/42.72 |
| 3,217,443 A * | 11/1965 | Goodman | A01K 91/06 43/42.46 |
| 3,396,485 A * | 8/1968 | Kuntz | A01K 85/08 43/44.6 |
| 3,482,747 A * | 12/1969 | Jones | A01K 65/00 224/103 |
| 3,570,070 A * | 3/1971 | Rose | A44B 9/00 24/357 |
| 3,648,399 A | 3/1972 | Lloyd | |
| 3,778,920 A * | 12/1973 | Anton | A01K 83/06 43/44.4 |
| 3,803,749 A | 4/1974 | Boyum | |
| 3,839,815 A * | 10/1974 | Latham | A01K 83/06 43/44.4 |
| 3,893,605 A * | 7/1975 | Mew | A01K 65/00 224/103 |
| 4,124,154 A * | 11/1978 | O'Russa | A01K 65/00 224/103 |
| 4,161,840 A * | 7/1979 | Kidd | A01K 83/00 43/37 |
| 4,194,315 A * | 3/1980 | Martin | A01K 65/00 43/55 |
| 4,422,260 A * | 12/1983 | Perrick | A01K 83/06 43/42.47 |
| 4,570,373 A * | 2/1986 | Brief | A01K 83/00 43/43.16 |
| 4,841,666 A | 6/1989 | Dallas | |
| 4,905,402 A | 3/1990 | Clark | |
| 4,989,361 A * | 2/1991 | Peterson | A01K 83/06 43/44.2 |
| 5,054,227 A * | 10/1991 | Lin | A01K 91/03 43/42.04 |
| 5,192,010 A * | 3/1993 | Green | A01K 65/00 224/103 |
| 5,218,780 A * | 6/1993 | Jacobson | A01K 83/06 43/44.4 |
| 5,274,947 A * | 1/1994 | Griffiths | A01K 83/06 43/44.2 |
| 5,313,736 A * | 5/1994 | Rosenberg | A01K 91/04 43/43.16 |
| 5,333,407 A * | 8/1994 | Merritt | A01K 83/06 43/44.4 |
| 5,386,661 A * | 2/1995 | Davis | A01K 83/06 43/44.2 |
| 5,548,920 A * | 8/1996 | Peddycoart | A01K 85/00 43/42.24 |
| 5,628,139 A | 5/1997 | Rhoten | |
| 5,628,244 A * | 5/1997 | Holliday | A47J 43/18 99/419 |
| 5,915,944 A * | 6/1999 | Strunk | A01K 85/00 43/42 |
| 5,950,351 A * | 9/1999 | Walker | A01K 83/06 43/44.2 |
| 6,421,949 B1 * | 7/2002 | Schytte | A01K 91/06 43/43.12 |
| 6,745,511 B1 * | 6/2004 | Falconer | A01K 91/02 43/43.15 |
| 7,024,813 B2 * | 4/2006 | Griss | A01K 83/06 43/44.2 |
| 7,140,146 B2 | 11/2006 | Gill | |
| D534,237 S * | 12/2006 | Shelton | D22/144 |
| D536,763 S * | 2/2007 | Friedrichs | D22/134 |
| 7,353,633 B1 * | 4/2008 | Lane | A01K 83/00 43/15 |
| 7,415,792 B1 * | 8/2008 | Noble | A01K 93/00 43/42.31 |
| 7,481,018 B1 * | 1/2009 | Adams | A01K 83/06 43/44.2 |
| 7,676,982 B1 * | 3/2010 | Lee | A01K 97/00 43/4 |
| 7,841,127 B1 * | 11/2010 | Nakamichi | A01K 83/00 43/42.24 |
| 7,874,094 B2 | 1/2011 | Brevig | |
| 7,874,096 B2 * | 1/2011 | Callaway | A01K 97/00 43/1 |
| 8,201,358 B2 | 6/2012 | Dohi | |

(56) References Cited

U.S. PATENT DOCUMENTS

| | | | | |
|---|---|---|---|---|
| D699,810 S * | 2/2014 | Monteleone | | D22/144 |
| 8,806,800 B2 * | 8/2014 | Hupp | | A01K 97/14 |
| | | | | 43/4 |
| 9,015,986 B2 * | 4/2015 | Bennis | | A01K 93/00 |
| | | | | 43/44.91 |
| 9,241,479 B2 * | 1/2016 | Poston | | A01K 97/00 |
| 9,474,260 B2 * | 10/2016 | Huebner | | A01K 95/00 |
| 9,872,486 B2 * | 1/2018 | Parks | | A01K 97/00 |
| 2005/0097806 A1 * | 5/2005 | Schumacher | | A01K 93/00 |
| | | | | 43/44.9 |
| 2007/0033857 A1 * | 2/2007 | Myers | | A01K 85/02 |
| | | | | 43/44.9 |
| 2009/0149836 A1 * | 6/2009 | Teachout | | A01K 97/00 |
| | | | | 604/540 |
| 2010/0005698 A1 * | 1/2010 | Raus | | A01K 97/00 |
| | | | | 43/4 |
| 2012/0260556 A1 * | 10/2012 | Hupp | | A01K 97/00 |
| | | | | 43/4 |
| 2013/0047487 A1 | 2/2013 | Hupp et al. | | |
| 2014/0215895 A1 * | 8/2014 | Zobrosky | | A01K 83/00 |
| | | | | 43/44.8 |
| 2015/0027030 A1 | 1/2015 | Huebner | | |
| 2015/0082685 A1 | 3/2015 | Poston | | |
| 2015/0189863 A1 * | 7/2015 | Stanaland | | A01K 83/06 |
| | | | | 43/4.5 |
| 2015/0313197 A1 * | 11/2015 | Leigh | | A01K 83/00 |
| | | | | 43/44.83 |

FOREIGN PATENT DOCUMENTS

| | | | | | |
|---|---|---|---|---|---|
| FR | 2591066 | A1 * | 6/1987 | | A01K 83/06 |
| FR | 2785145 | | 10/1998 | | |
| FR | 2785145 | A1 * | 5/2000 | | A01K 83/06 |
| FR | 2809283 | | 5/2000 | | |
| FR | 2809283 | A1 * | 11/2001 | | A01K 83/06 |
| FR | 2849577 | | 1/2003 | | |
| FR | 2849577 | A1 * | 7/2004 | | A01K 83/06 |
| GB | 2220833 | | 1/1990 | | |
| GB | 2220833 | A * | 1/1990 | | A01K 83/06 |
| JP | 2001258444 | | 9/2001 | | |
| JP | 2001258444 | A * | 9/2001 | | |
| JP | 2003/102337 | | 4/2003 | | |
| JP | 2003230330 | | 8/2003 | | |
| JP | 2003230330 | A * | 8/2003 | | |
| JP | 2010213618 | | 9/2010 | | |
| JP | 2010213618 | A * | 9/2010 | | |
| WO | 1998/07312 | | 2/1998 | | |
| WO | 2001/00018 | | 1/2001 | | |

OTHER PUBLICATIONS

SeaQualizer Webpage (http://seaqualizer.com/products/standard-seaqualizer).
Alaska Department of Fish and Game, Rockfish Conservation and Deepwater Release (http://www.adfg.alaska.gov/index.cfm?adfg=fishingSportFishingInfo.rockfishconservation).
Hogy, Best Seller: Tarpon Lures (http://www.hogylures.com/best-tarpon-lures).
Google Image Search for "bait keeper screw lock".
www.ifish.net forum, China Tiger (no meat just pics), (See p. 8).
"Shelton's Fish Descender" Shelton Products. May 14, 2013; [retrieved from the internet][retrieved on Mar. 1, 2015]. <URL: http://www.outdoorproshop.com/Sheltons-Fish-Descender-p/sheltons-fish-descender.htm>; figure 1, intro paragraph.
International Search Report for International application No. PCT/US14/69860, dated Mar. 18, 2015.

* cited by examiner

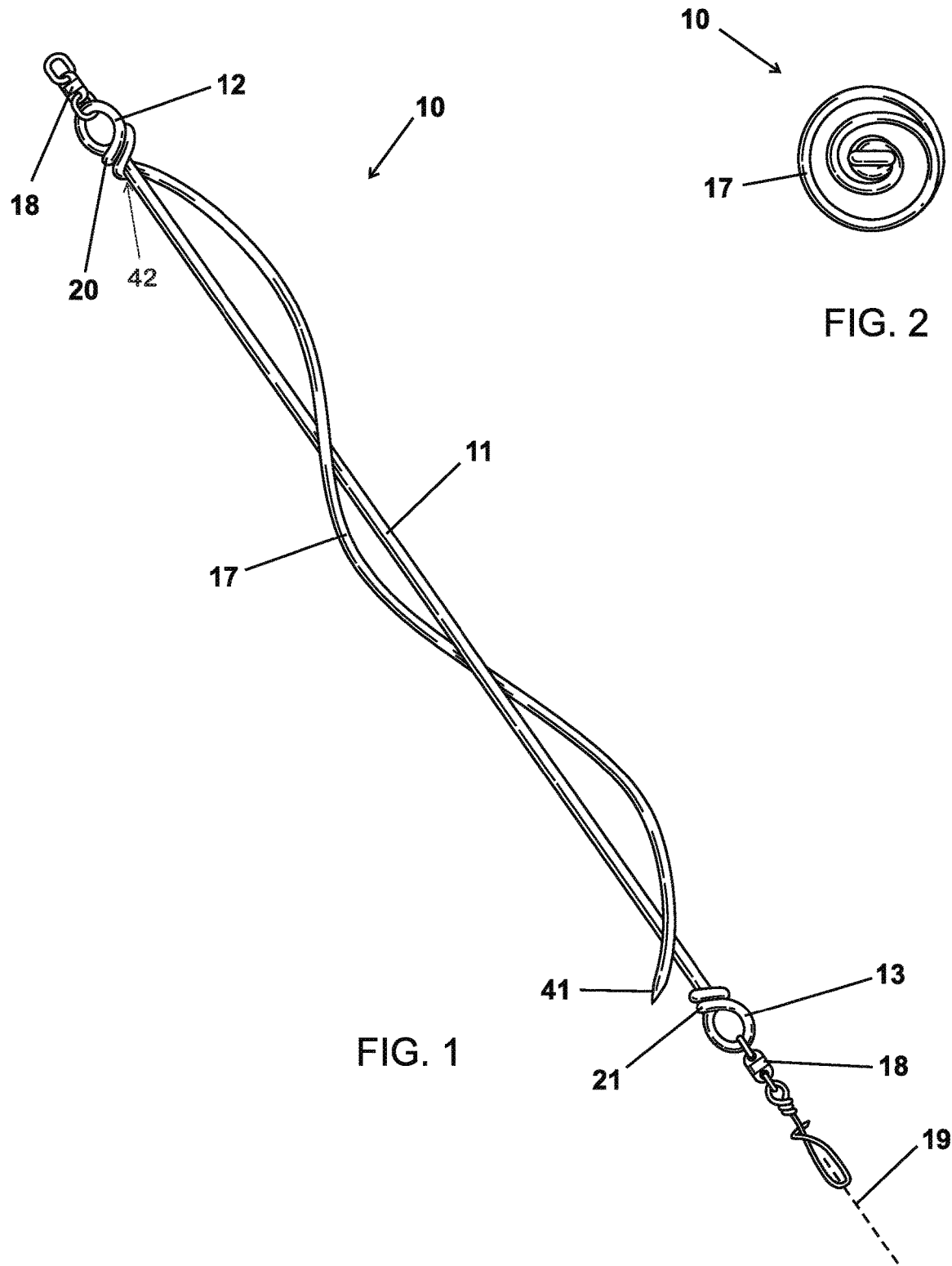

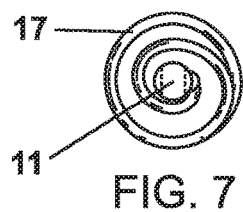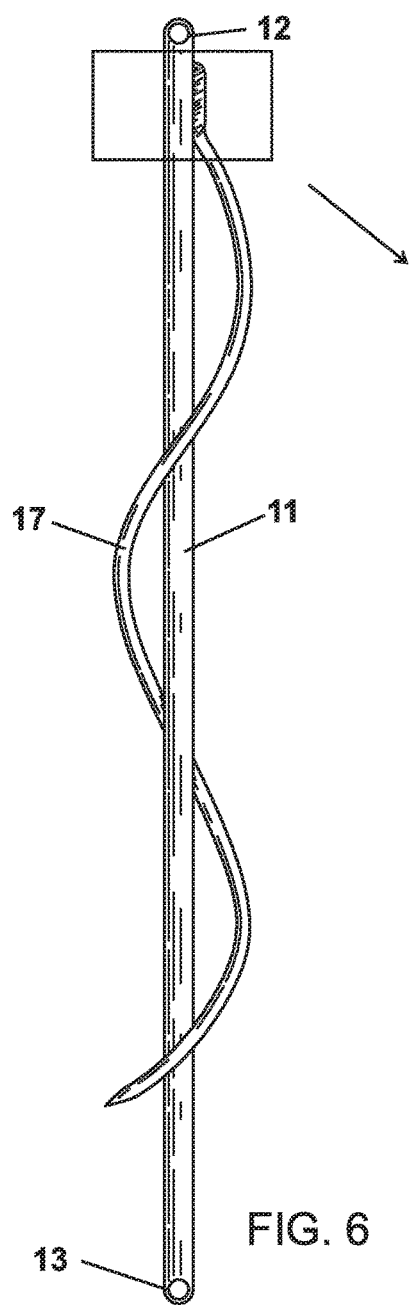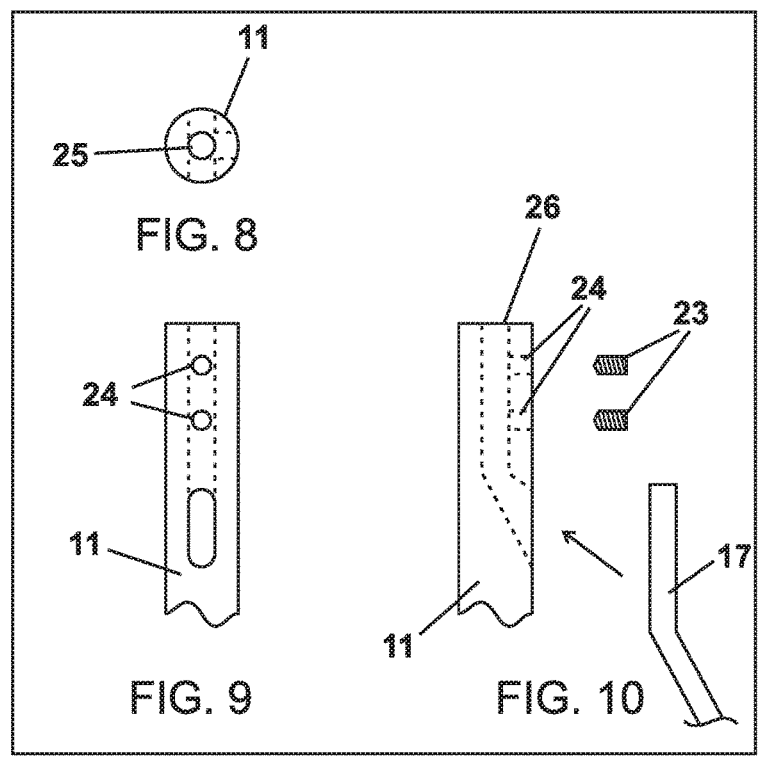

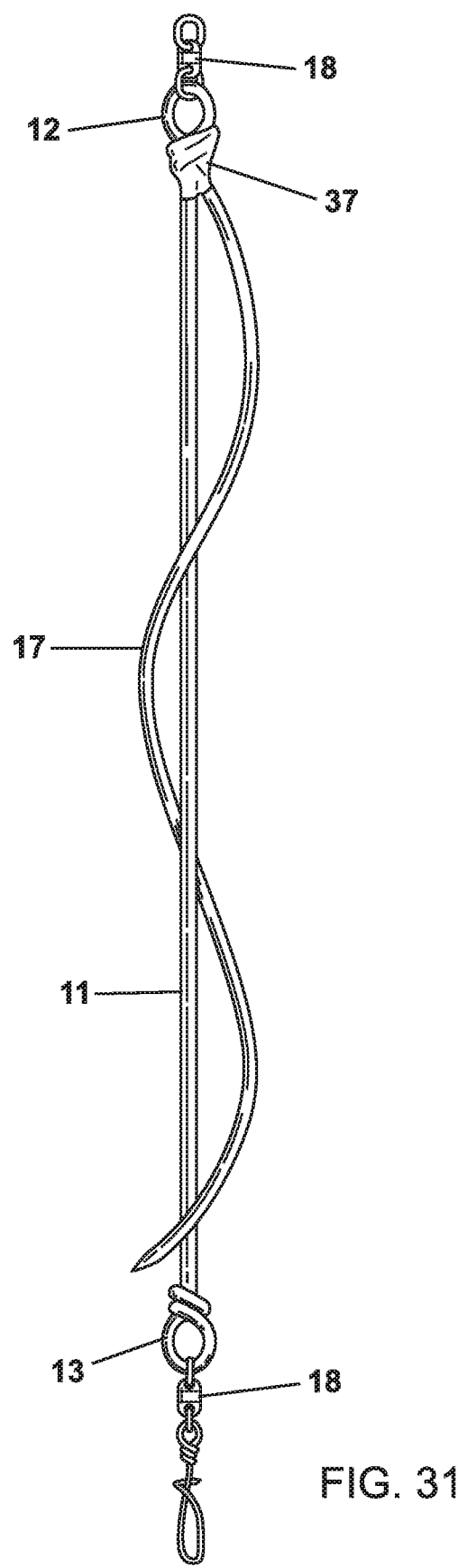
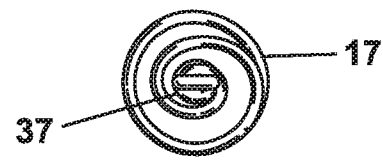
FIG. 32
FIG. 31

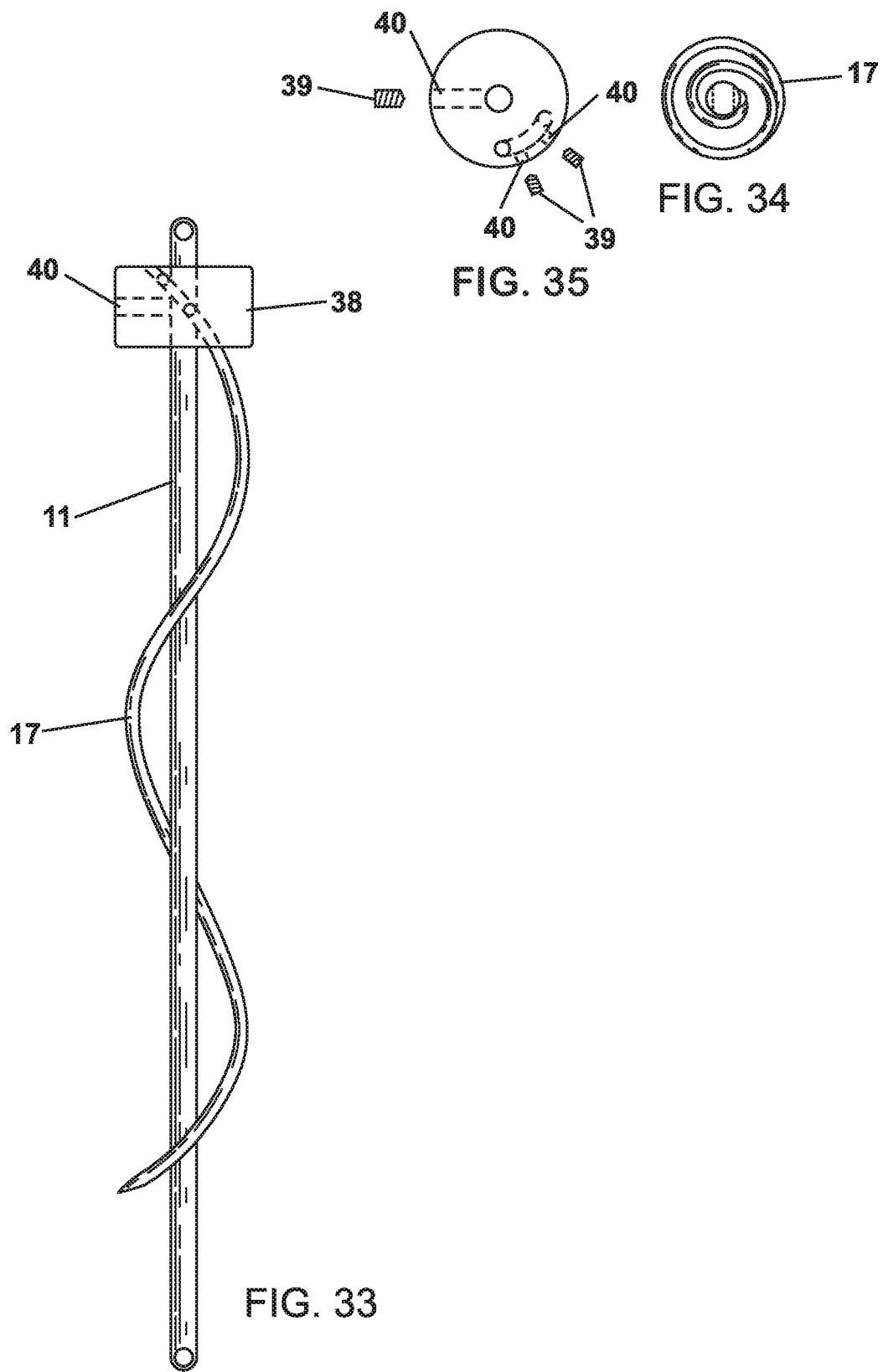

DEEPWATER FISH RELEASE DEVICE

CROSS-REFERENCE TO RELATED APPLICATIONS

This is a continuation of U.S. patent application Ser. No. 14/568,105, filed 11 Dec. 2014 (issued as U.S. Pat. No. 9,872,486 on 23 Jan. 2018), which claims benefit of U.S. Provisional Patent Application Ser. No. 61/915,228, filed 12 Dec. 2013, and U.S. Provisional Patent Application Ser. No. 61/980,435, filed 16 Apr. 2014.

Priority of U.S. Provisional Patent Application Ser. No. 61/915,228, filed 12 Dec. 2013, and U.S. Provisional Patent Application Ser. No. 61/980,435, filed 16 Apr. 2014, each of which is hereby incorporated herein by reference, is hereby claimed.

Incorporated herein by reference is U.S. Provisional Patent Application No. 61/915,228, filed 12 Dec. 2013, and U.S. Provisional Patent Application Ser. No. 61/980,435, filed 16 Apr. 2014, priority of each of which is hereby claimed.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to a method and a device for releasing fish into the water at a desired water depth. More particularly, the present invention relates to an improved release device designed to counter the effects of barotrauma by more effectively and safely returning a caught fish back to the depth at which it was hooked.

2. General Background of the Invention

The present invention is intended to provide a means of which to release illegal, undersized or unwanted fish in a manner which will increase their chances of survival. National Marine Fisheries and other organizations, such as Florida Sea Grant, have been searching for means to accomplish this for several years and there are some devices on the market currently. There has been at least one event in which organizations have tested devices and encouraged ideas to come forward. There does not appear to be a device that uses the physics that this present device relies on to make the release.

There are several devices currently available, including several possibly relevant patents that have issued that are directed generally to releasing fish back into the water. The existing devices fall primarily into two groups. The patented ones tend to be complex and expensive. There are also a number of devices in a second group that are very simple and more of homemade types. The present invention falls in between the two groups. The complex group may not likely be affordable enough for all anglers and also may be subject to difficulty in use and possible malfunction. The simple group for the most part is very cheap, but most fail to have some method of keeping the fish secure while returning it to the water. Also, most of the available devices are fairly obvious and probably would not be advantageous or profitable to manufacture. Some of the current designs are intended for use where the actual fishing occurs on the bottom and will only release fish upon impact with the ocean bottom. In the Gulf of Mexico and some other areas, fish may be suspended around oil rigs and the ocean bottom is not an option for release as it may be several thousand feet deep.

The following US patents and Publications are incorporated herein by reference:

U.S. Pat. Nos. 3,648,399; 4,481,666; 4,905,402; 5,628,139; 7,140,146; 7,874,094; 7,874,096; 8,201,358; and U.S. Pat. Des. D534,237; US Publication Document No.: 2013/0048487.

The following other references are incorporated herein by reference:

PCT Publication Nos.: WO 2001/00018, WO1998/07312; Foreign Publication No.: JP2003/102337; Publications: Shelton Fish Descender Webpage (http://www.sheltonproducts.com/SFD.html); SeaQualizer Webpage (http://www.seaqualizer.com/Standard-Striper-SeaQualizer-20-40-70ft-STPRSQL-20-40-70.htm); Alaska Department of Fish and Game, Rockfish Conservation and Deepwater Release (http://www.adfg.alaska.gov/index.cfm?adfg=fishingSportFishingInfo.rockfishconservation); Hoggy, Best Seller: Tarpon Lures (http://www.hogy-lures.com/best-tarpon-lures); Google Image Search for "bait keeper screw lock"; www.ifish.net forum, China Tiger (no meat just pics), (See page 8).

BRIEF SUMMARY OF THE INVENTION

The present invention includes a device for releasing fish into water, comprising a central member that can have an upper end portion and a lower end portion, each said end portion having an eyelet, a spiral member circling around the central member, the spiral member being spaced away from the central member and having a free end. The device has a plurality of swivels, wherein a swivel can be connected to each of the eyelets. A weight can be connected to the swivel located at the lower end portion.

In one embodiment the central member can be straight or linear.

In one embodiment, the central member and the spiral member can be about the same length.

In one embodiment, one fish can be attached to the spiral member.

In one embodiment, multiple fish can be attached to the spiral member.

In one embodiment, the central member and the spiral member are made of rigid wire.

In one embodiment, a fishing line can be connected to the swivel of the upper end portion.

In one embodiment, the swivels can allow the spiral member to spin on an axis.

In one embodiment, the central member, the spiral member and the eyelets can be formed from one continuous piece of wire.

In one embodiment, the spiral member can be held in place by the central member.

In one embodiment, the spiral member can circle several times around the length of the central member.

In one embodiment, the weight can be of different sizes.

In one embodiment, the present invention further comprises baited hooks that can be attached to the upper end portion and the lower end portion.

In one embodiment, the apparatus of the invention comprises a single thread/rod forming both a spiral member and a central member.

In one embodiment, the apparatus of the invention comprises a separate spiral member that can be attached to a separate central member.

In one embodiment, a plurality of spiral members can be attached to the central member.

In one embodiment, the spiral member can be removably attached to the central member.

In one embodiment, a plurality of fish can be attached to the spiral member.

In one embodiment, the central member can further comprise an internal channel for threading a line through the length of the central member.

The present invention includes an apparatus for releasing a fish into deep water. The apparatus provides a central member having an upper end portion and a lower end portion, each end portion having an eyelet, a spiral member can be attached to the central member, and the spiral member can be spaced away front the central member and can have a free end. The apparatus further provides upper and lower swivels, wherein each swivel can be connected to a said eyelet, and a weight can be connected to the lower swivel.

The present invention includes a device for releasing a fish having a buoyancy into deep water. The device of the present invention provides a central member that can have an upper end portion and a lower end portion, a spiral member that can be connected to the central member at the upper end portion of the central member and circling around the central member, the spiral member being spaced away from the central member and having a free end. The device can further provide a plurality of swivels, wherein one of the swivels can be connected the upper end portion of the central member and another of said swivels can be connected to the lower end portion of the central member. The device can further provide a weight on the central member that overcomes buoyancy of the fish.

In one embodiment, the line can be attached to the swivels.

In one embodiment, the present invention further comprises a plurality of beads, wherein one of the beads can be placed on the line at the upper end portion and another of the beads can be placed at the lower end portion.

In one embodiment, the spiral member can be attached to the central member by a gusset.

In one embodiment, the spiral member can be attached to the central member by encapsulation in some liquefied metal or plastic.

In one embodiment, the spiral member can be attached to the central member by a collar.

In one embodiment, the collar can be a moving collar.

The present invention includes a method for releasing a fish having a buoyancy into deep water, comprising the steps of utilizing the fish releasing device by threading the free end of the spiral member through the jaw of a fish, lowering the device and the fish into the water to a desired depth, pulling up on the device thereby causing the device to spin on an axis and release the fish at the desired depth.

In one embodiment, the spiral member is threaded through the gills of the fish.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein:

FIG. 1 is a side view of a preferred embodiment of the apparatus of the present invention;

FIG. 2 is a top view of a preferred embodiment of the apparatus of the present invention as shown in FIG. 1;

FIG. 6 is a side view of a first alternate embodiment of the apparatus of the present invention showing an alternate means of attaching a spiral member to a center member;

FIG. 7 is a top view of a first alternate embodiment of the apparatus of the present invention as shown in FIG. 6;

FIG. 8 is a top sectional view of the center member of a first alternate embodiment of the apparatus of the present invention as shown in FIG. 6;

FIG. 9 is a side sectional view of the center member of a first alternate embodiment of the apparatus of the present invention as shown in FIG. 6;

FIG. 10 is a side exploded view of the center member and spiral member of a first alternate embodiment of the apparatus of the present invention as shown in FIG. 6;

FIG. 31 is a side view of an eleventh alternate embodiment of the apparatus of the present invention;

FIG. 32 is a top view of an eleventh alternate embodiment of the apparatus of the present invention as shown in FIG. 31;

FIG. 33 is a side view of a twelfth alternate embodiment of the apparatus of the present invention including a collar;

FIG. 34 is a top view of a twelfth alternate embodiment of the apparatus of the present invention as shown in FIG. 33; and FIG. 35 is a top view of a twelfth alternate embodiment of the apparatus of the present invention as shown in FIG. 33.

DETAILED DESCRIPTION OF THE INVENTION

Figure 3:
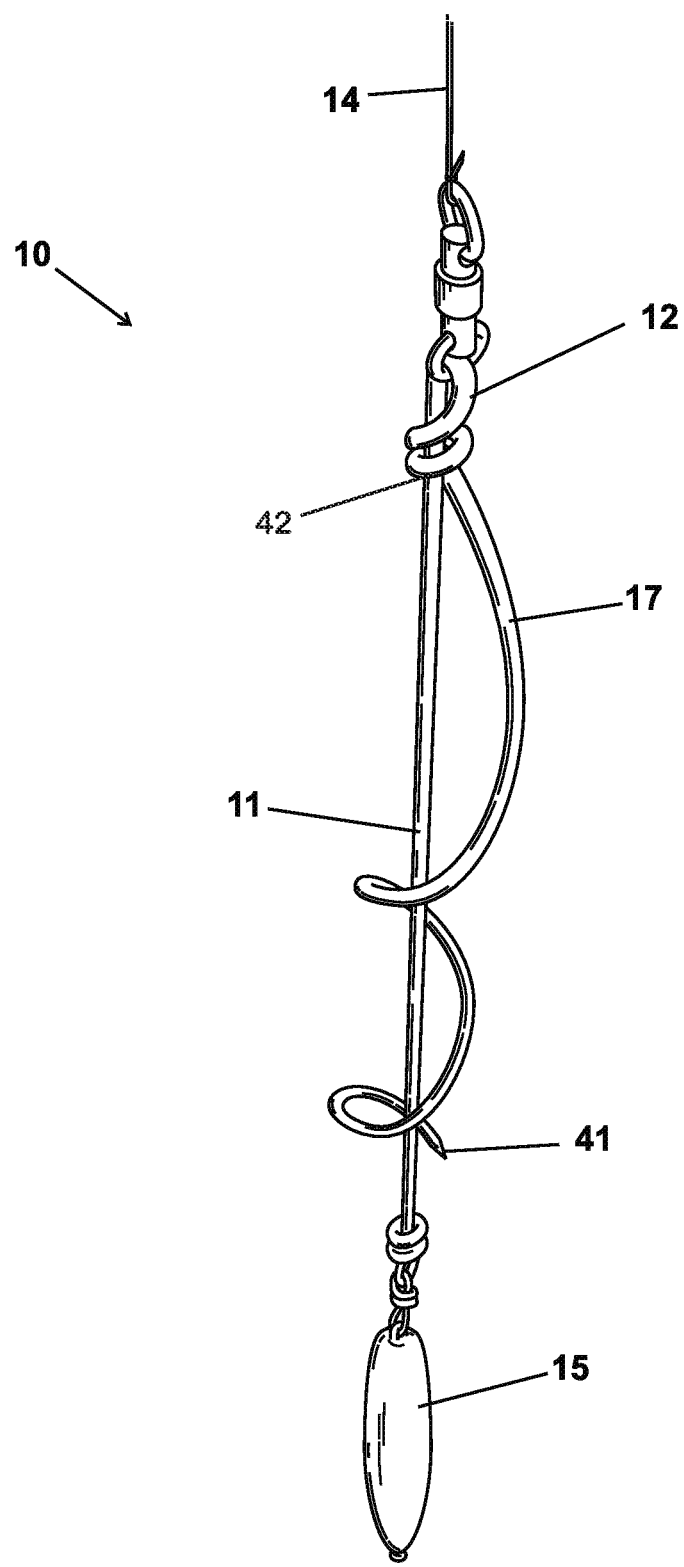
FIG. 3 is a top perspective view of a preferred embodiment of the apparatus of the present invention with a weight attached to the center member.
Figure 4:
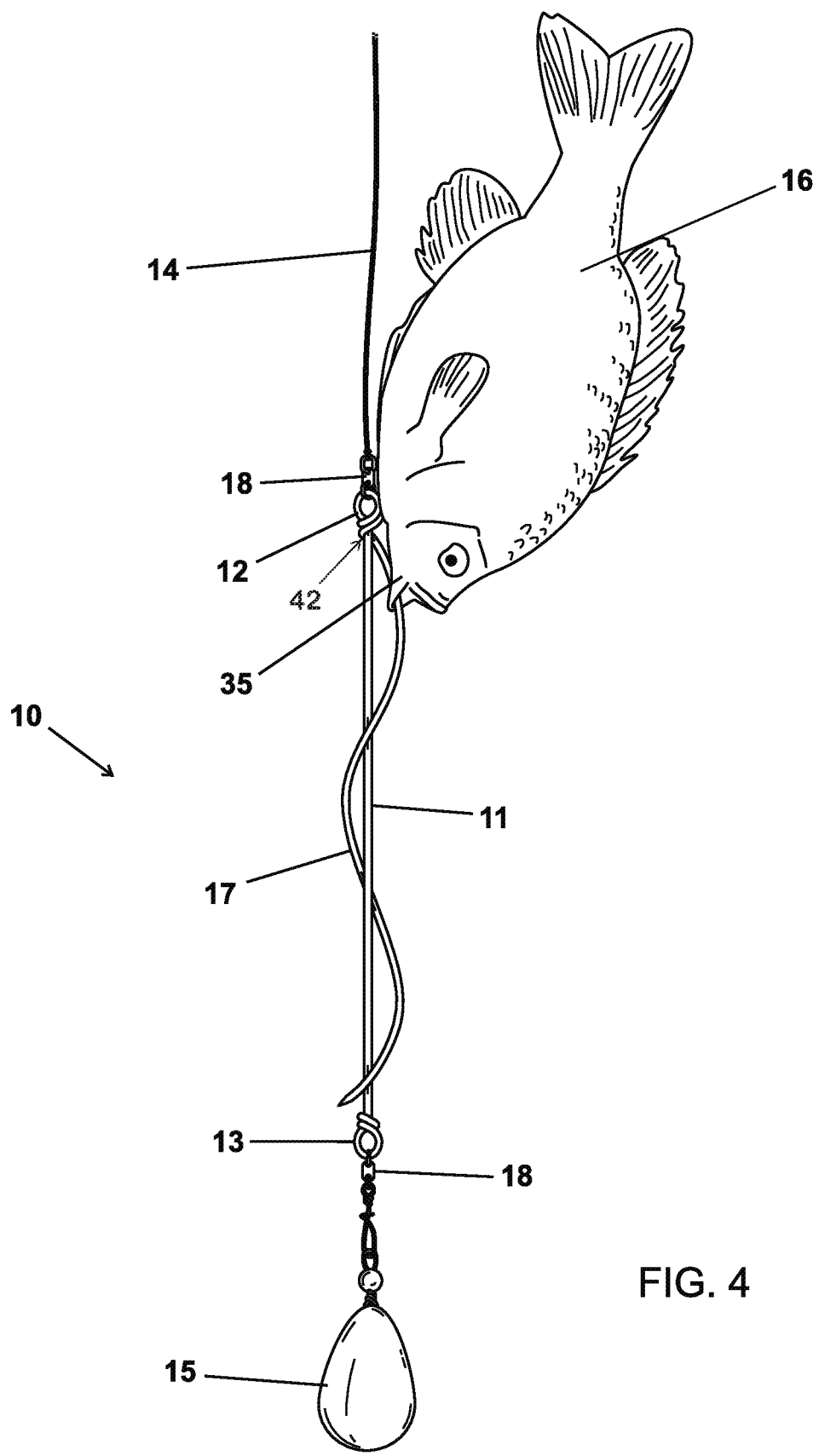
FIG. 4 is a side view of a preferred embodiment of the apparatus of the present invention with a fish attached to the spiral member and a weight attached to the center member.
Figure 5:
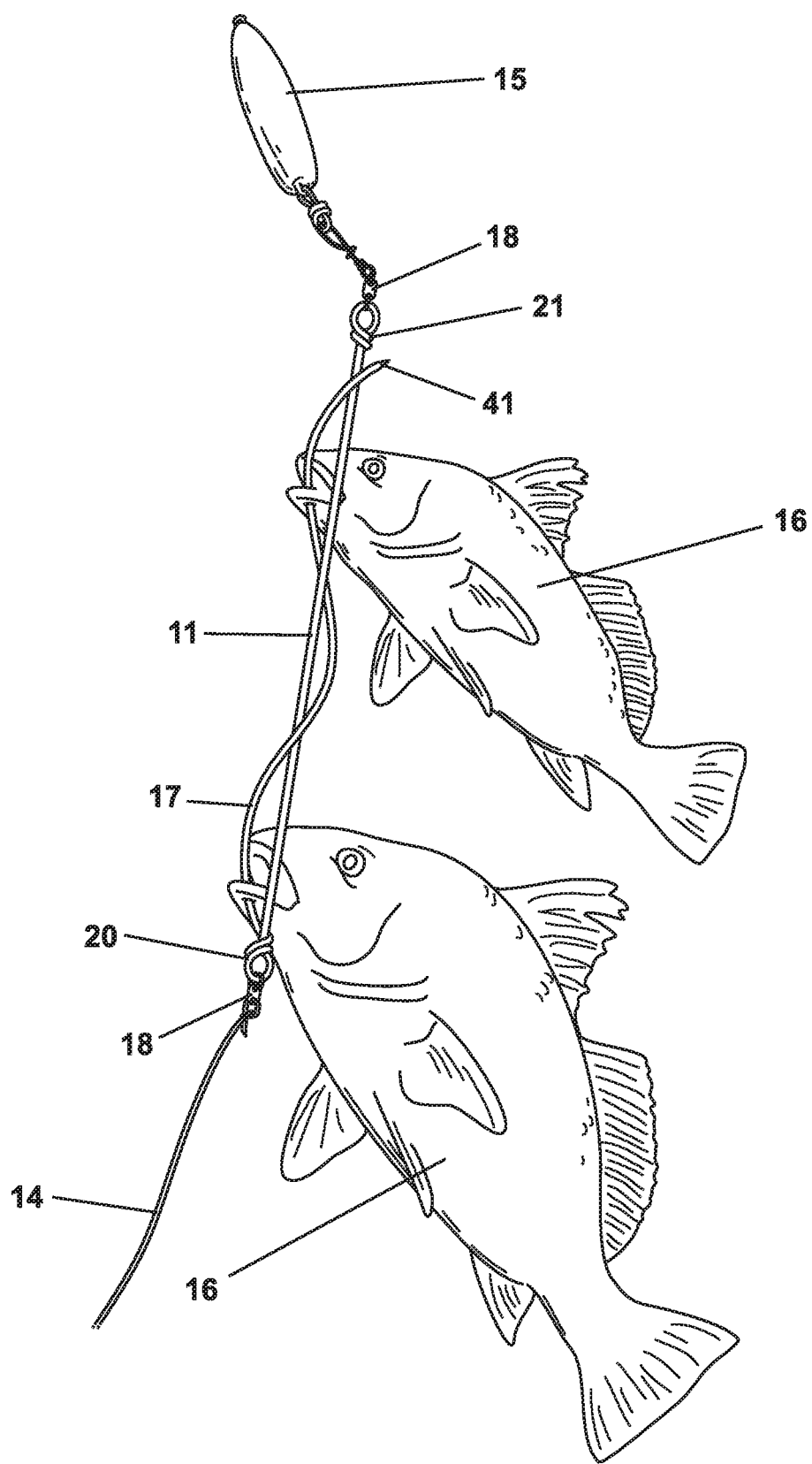
FIG. 5 is a side perspective view of a preferred embodiment of the apparatus of the present invention with multiple fish attached to the spiral member and a weight attached to the center member.
Figure 12:
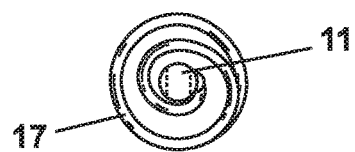
FIG. 12 is a top view of a second alternate embodiment of the apparatus of the present invention as shown in FIG. 11.
Figure 11:
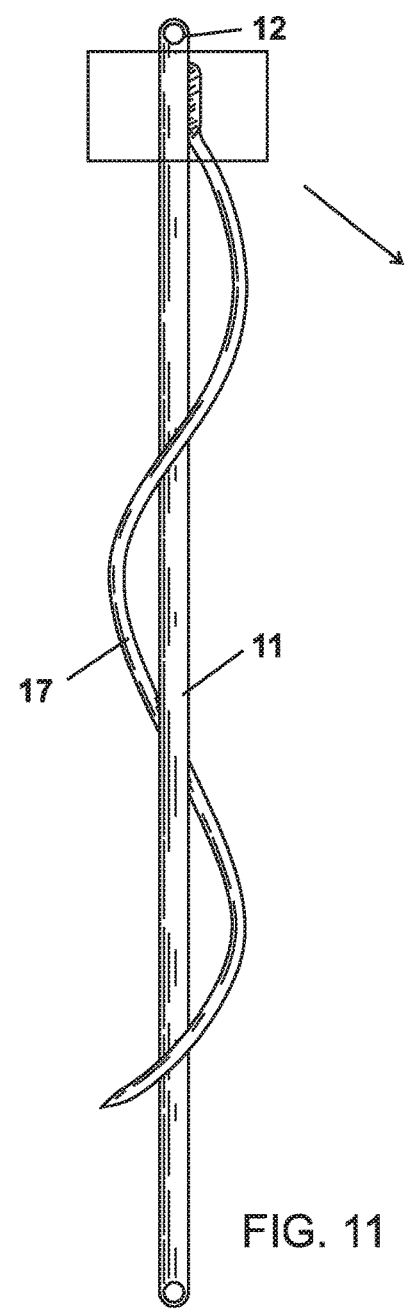
FIG. 11 is a side view of a second alternate embodiment of the apparatus of the present invention showing an alternate means of attaching a spiral member to a center member.
Figure 13:
FIG. 13 is a top sectional view of the center member of a second alternate embodiment of the apparatus of the present invention as shown in FIG. 11.

The apparatus of the present invention is seen in FIGS. 1-35 and can include a center member 11 with an eye, eyelet or hole 12, 13 on each end. The center member 11 can connect between a fishing line 14 on top portion 20 and a weight 15 on bottom portion 21. Member 11 can be linear or straight. Fishing line 14 can attach to eyelet or hole 12 on member 11. Weight 15 can be used to descend device 10 and a buoyant, injured fish 16.

Around the center member 11 can be a spiral member 17 that preferably twists around the central member 11. Spiral member 17 has free end 41 and an end joined to center member 11 at connection 42. A single thread/rod can form both spiral member 17 and center member 11 (see FIGS. 1-5). Alternatively, spiral member 17 can be attached/supported on center member 11 by a number of different ways, as seen in at least FIGS. 6-21, 29-35.

Spiral member 17 free end 41 can be threaded through the bottom jaw 35 of one or more fish 16 to secure the fish to device 10. Preferably, spiral member 17 can be inserted from the lower exterior of the fish's mouth and exit through the fish's mouth to orient the fish facing downward on descent (see FIGS. 4, 5 and 24). Spiral member 17 can also be fed through the fish's gills and out of the mouth with the same result. Other attachments of fish 16 to spiral member 17 could be used.

Swivels 18 can be used at each end 20, 21 of device 10 and which allow the entire member sections, including the spiral member 17 and the center member 11, to spin on axis 19 (see FIG. 1). Fishing line 14 can be attached to swivel 18 located on the upper end portion 20 and weight 15 can be attached to swivel 18 located on the lower end portion 21.

Device 10 with one or more fish 16 attached can be used to return the fish to a desired depth by a mark on the fishing line 14, line counter, or just an estimation. As the device 10 with fish 16 attached is going down or lowered into the water, the spiral wire 17 holds the fish at top portion 20 of device 10 as the fish is still buoyant from barotrauma. When the desired depth is reached and the line 14 is reeled upward, the device 10 will spin on axis 19 and allow the fish 16 to simply slide off downward and off of free end 41. Member sections 11, 17 can spin on axis 19 when ascending to the water surface. Member sections 11, 17 generally do not spin when descending to the desired depth.

For all embodiments, the single thread/rod can be made of a wire. The wire of the apparatus is preferably made of stainless wire, carbon steel, monel, polymer, or fiberglass reinforced polymer. For example, 316 stainless can preferably be used as it is the most cost effective and sensible material at present.

For all embodiments, the length of device 10 can be preferably 6 inches to 3 feet (15.24 cm to 91.44 cm). More preferably, the length can be 1 feet to 2 feet (30.48 cm to 60.96 cm). Most preferably, the length of device 10 can be 6 to 18 inches (15.24 cm to 45.72 cm). The length of device 10 can be for example 6 inches (15.24 cm). For example, in California and other areas, anglers commonly release rockfish which are often less than 1 lb. (0.45 kg), making it desirable to have device 10 be about 6" (15.24 cm) in total length.

For all embodiments, the width of the center member and spiral member of the apparatus can be preferably ³⁄₃₂ inch to ½ inch (0.24 cm to 1.27 cm). Most preferably, the width can be ⅛ inch to ⁵⁄₁₆ inch (0.32 cm to 0.8 cm). To mitigate the harm to fish when attaching fish to the spiral member 17, it is preferable to use a single thread/rod with a smaller width.

For all embodiments, the number of turns of the spiral member 17 around the center member 11 of the apparatus can be preferably 1 to 10. More preferably, the number of turns of the spiral member 17 around the center member 11 of the apparatus can be 1 to 5. Most preferably, the number of turns of the spiral member 17 around the center member 11 of the apparatus can be 2 to 4. The number of turns can be for example 3.

For all embodiments, the radius of the spiral member 17 from the center member 11 of the apparatus can be preferably ⅜" to 1½" (0.95 cm to 3.81 cm). More preferably, the radius of the spiral member 17 from the center member 11 of the apparatus can be ½" to 1¼" (1.27 cm to 3.18 cm). Most preferably, the radius of the spiral member 17 from the center member 11 of the apparatus can be ⅝" to 1" (1.59 cm to 2.54 cm). The radius of the spiral member 17 from the center member can be for example ¾" (1.91 cm).

For all embodiments, the apparatus can preferably accommodate at least one fish weighing less than 1 pound to 500 lbs (0.45 kg to 226.8 kg). More preferably, the apparatus can accommodate fish weighing 2 to 50 pounds (0.91 kg to 22.7 kg). Most preferably, the apparatus can accommodate fish weighing 3 to 25 pounds (1.36 kg to 11.4 kg).

For all embodiments, the apparatus preferably can accommodate a plurality of fish weighing less than 1 pound to 500 lbs (0.45 kg to 226.8 kg) combined. More preferably, the apparatus can accommodate a plurality of fish weighing 5 to 100 pounds (2.27 kg to 45.36 kg) combined. Most preferably, the apparatus can accommodate a plurality of fish weighing 10 to 50 (4.54 kg to 22.7 kg) combined. The larger the fish, the more weight required to descend the fish to the desired depth.

For all embodiments, the device can be injection molded or manufactured with other materials or by other processes.

Single Construction

In one embodiment as seen in FIGS. 1-5 and 25, device 10 of the invention comprises a single thread/rod forming both a spiral member 17 and a center member 11. The length of this embodiment can be, for example, 12 inches (30.48 cm). Alternatively, the length can be, for example, 18 inches (45.72 cm). The most preferred width of the single thread/rod of the apparatus of this embodiment is the apparatus is ⅛ inch (0.32 cm). Eyes 12, 13 are also made of the single thread/rod wire, as seen in FIGS. 1-5 and 25.

Joined Construction

In one embodiment, the apparatus of the invention comprises a separate spiral member 17 that can be attached to a separate central member 11. In this embodiment, the spiral member 17 can be preferably a twisted spiral wire. The twisted spiral wire of the apparatus can be preferably made of stainless wire. In this embodiment, the center member 11 can be preferably of a shape allowing rotation along an axis 19. Center member 11 can have eyes 12, 13 made into the rod, as seen for example in FIGS. 21, 23. The center member 11 preferably comprises a heavy rod center to add strength to the apparatus for accommodating larger fish or for multiple fish 16. The apparatus of this embodiment is preferably capable of releasing possibly tens of fish on each descent. The center member is preferably made of stainless steel. The heavy rod is preferably made of stainless steel.

In this embodiment, the length can be preferably 1 foot to 4 feet (30.48 cm to 121.92 cm). More preferably, the length of this embodiment can be less than 2 feet (60.96 cm). Most preferably, the length of this embodiment can be about 15 inches to 20 inches (38.1 cm to 50.8 cm). In one alternative, the length of the apparatus of this embodiment can be for example 20 inches (50.8 cm). In another alternative, the length of the apparatus of this embodiment can be for example 36 inches (91.44 cm). The length is based on fish size and ease of storage.

In this embodiment, the width of the spiral member 17 of the apparatus is preferably 3/32 inch to ¼ inch (0.24 cm to 0.64 cm). More preferably, the width of the spiral member 17 is 18 inch to ¼ inch. Most preferably, the width of the spiral member 17 can be for example ⅛ inch (0.32 cm). Most preferably, the width of the spiral member 17 of the apparatus can be ⅛ inch to 3/16 inch (0.48 cm) for larger fish.

In this embodiment, the width of the center member 11 of the apparatus is preferably 3/16 inch to ½ inch (0.48 cm to 1.27 cm). More preferably, the width of the center member 11 of the apparatus is 3/16 inch to 5/16 inch (0.48 cm to 0.8 cm). A preferred width of the center member 11 of the apparatus of this embodiment is 5/16 inch (0.8 cm). Alternatively, a preferred width of the center member 11 can be 3/16 inch (0.48).

Various Attachments of the Spiral Member to the Center Member

Figure 23:
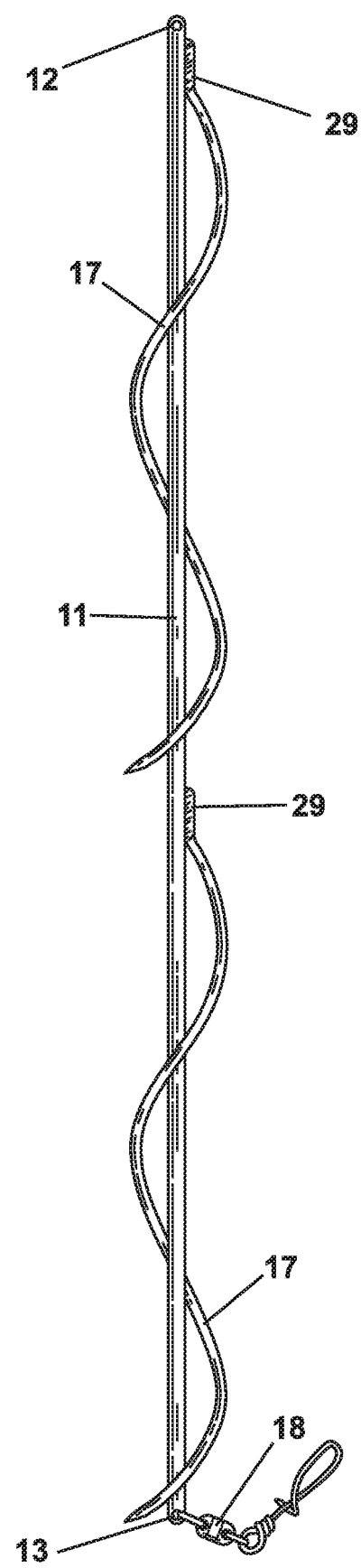
FIG. 23 is a side view of a fifth alternate embodiment of the apparatus of the present invention showing multiple spiral members.
Figure 24:
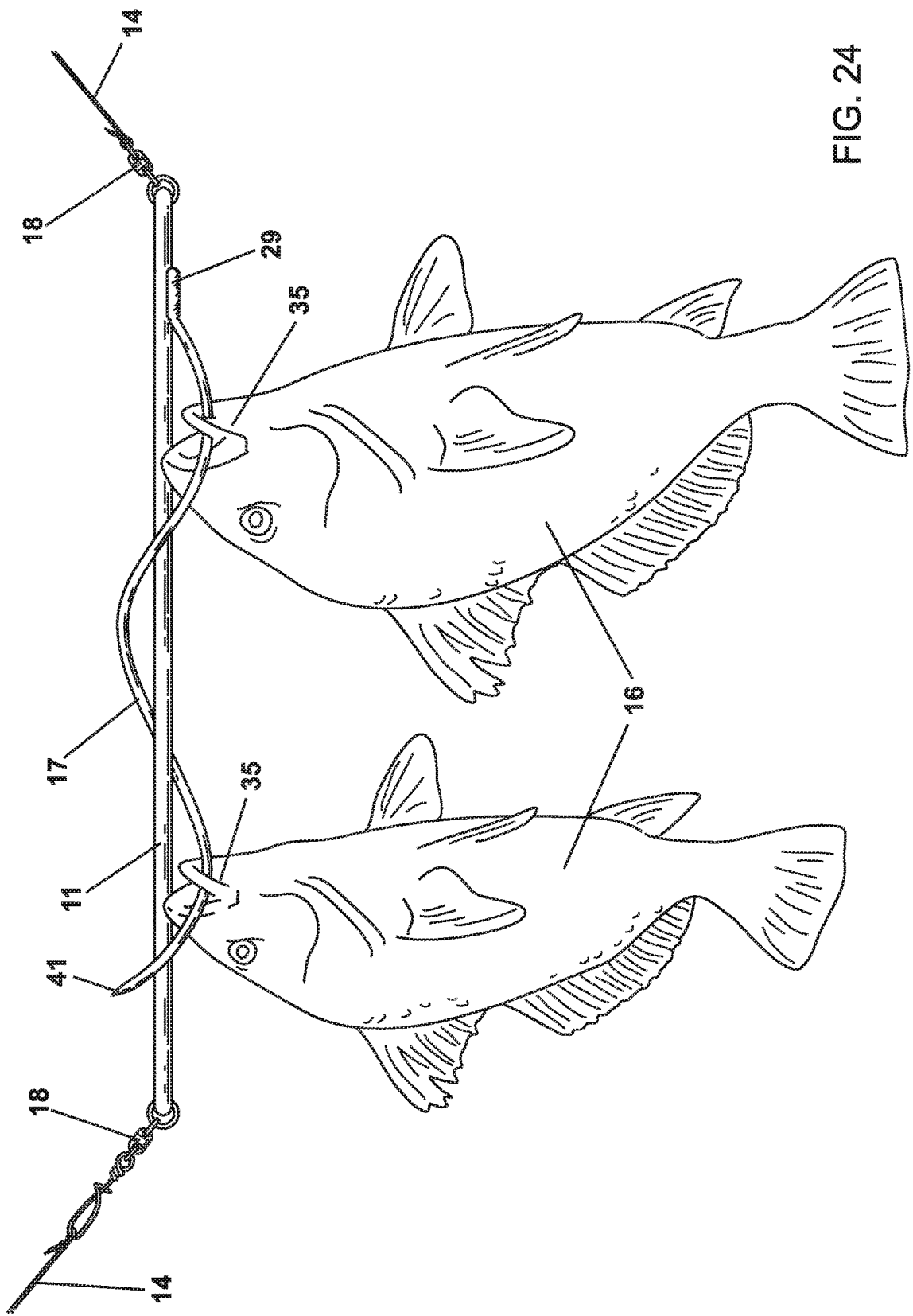
FIG. 24 is a side view of a sixth alternate embodiment of the apparatus of the present invention attached to fishing lines on both end and with multiple fish attached to the spiral member.
Figure 25:
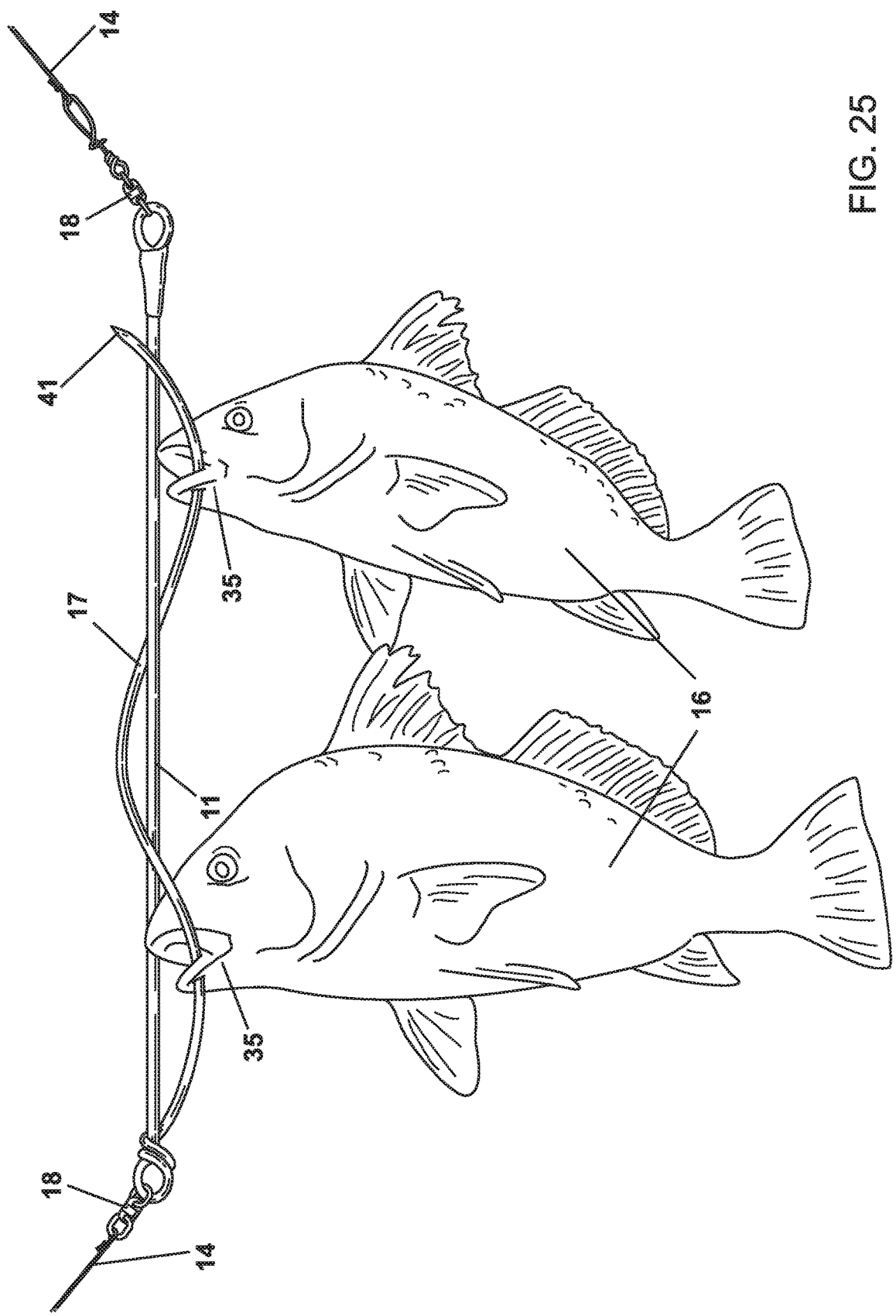
FIG. 25 is a side view of a seventh alternate embodiment of the apparatus of the present invention with multiple fish attached to the spiral member.
Figure 26:
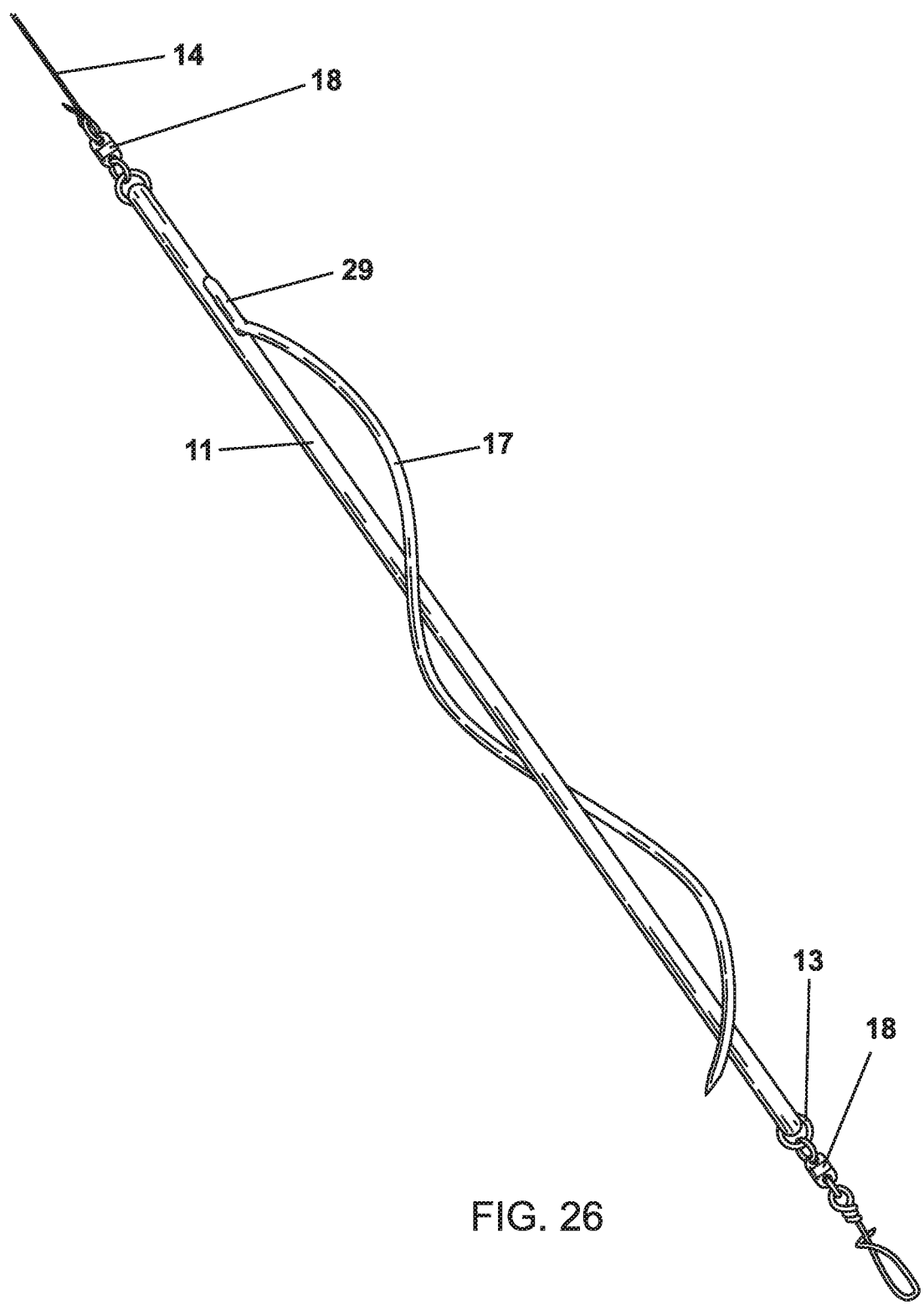
FIG. 26 is a side view of an eighth alternate embodiment of the apparatus of the present invention showing an alternate means of attaching a spiral member to a center member.

In one embodiment, a plurality of separate spiral members 17 can be attached to central member 11. More preferably, two twisted spiral members 17 can be attached to the central member 11 as seen in FIG. 23. In this embodiment, each spiral member of the apparatus is preferably a twisted spiral wire. Each twisted spiral wire of the apparatus is preferably made of stainless wire. Preferably, the multiple spiral members 17 can allow for multiple releases with more fish. In one embodiment, the length of the apparatus of this embodiment is 20 inches (50.8 cm). In one embodiment, the length of the apparatus of this embodiment is most preferably 36 inches (91.44 cm).

FIGS. 6-21, 29-35 show alternate ways of attaching member 17 to center member 11.

In FIGS. 6-10, spiral member 17 can be inserted in opening 26 in center member 11 and secured to center member 11 with screws 23 that are inserted into holes 24, 25 in center member.

Figures 14, 15:
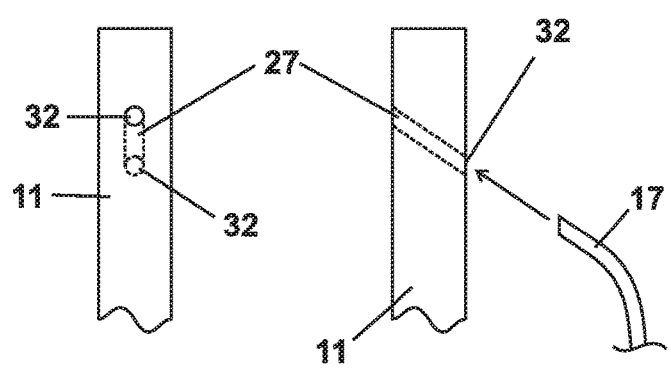
FIG. 14 is a side sectional view of the center member of a second alternate embodiment of the apparatus of the present invention as shown in FIG. 11.
FIG. 15 is a side exploded view of the center member and spiral member of a second alternate embodiment of the apparatus of the present invention as shown in FIG. 11.
Figure 17:
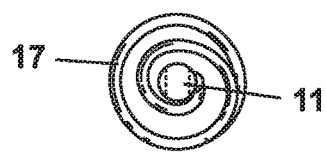
FIG. 17 is a top view of a third alternate embodiment of the apparatus of the present invention as shown in FIG. 16.
Figure 16:
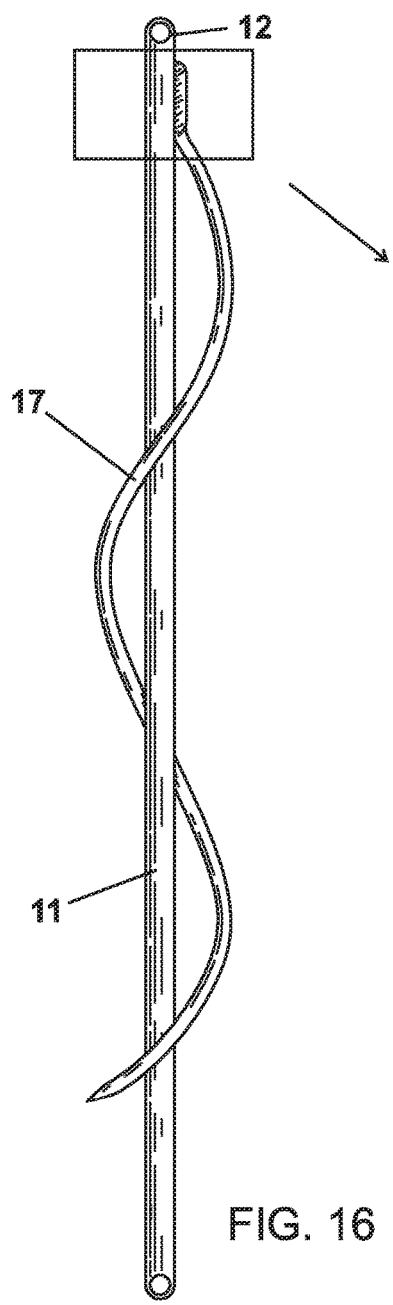
FIG. 16 is a side view of a third alternate embodiment of the apparatus of the present invention showing an alternate means of attaching the spiral member to the center member.
Figure 18:
FIG. 18 is a top sectional view of the center member of a third alternate embodiment of the apparatus of the present invention as shown in FIG. 16.
Figure 19:
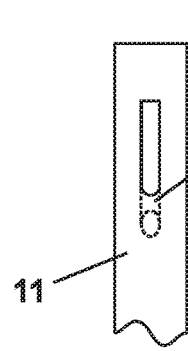
FIG. 19 is a side sectional view of the center member of a third alternate embodiment of the apparatus of the present invention as shown in FIG. 16.

In FIGS. 11-15, spiral member 17 can be inserted in opening 27 in center member 11 and secured to center member 11 by a weld or welding. Spiral member 17 can be welded to center member 11 at weld/attachment points 32, as seen in FIGS. 14, 15.

Figure 20:
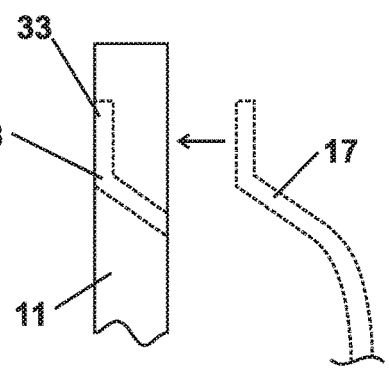
FIG. 20 is a side exploded view of the center member and spiral member of a third alternate embodiment of the apparatus of the present invention as shown in FIG. 16.
Figure 22:
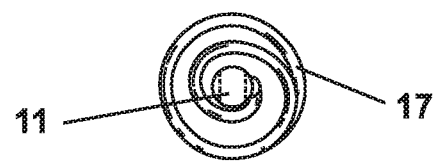
FIG. 22 is a top view of a fourth alternate embodiment of the apparatus of the present invention as shown in FIG. 21.
Figure 21:
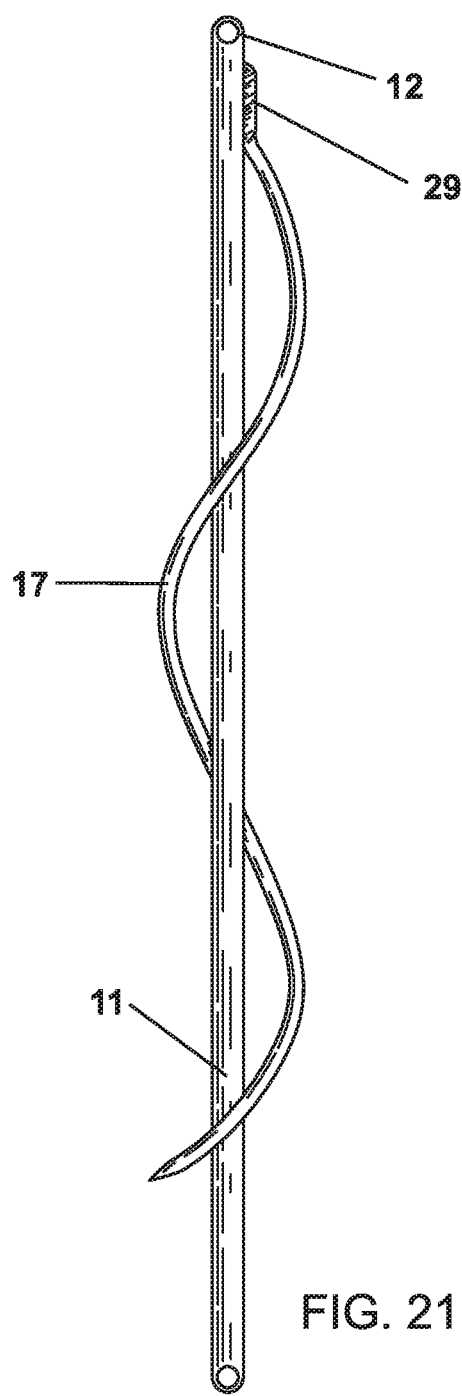
FIG. 21 is a side view of a fourth alternate embodiment of the apparatus of the present invention showing an alternate means of attaching a spiral member to a center member.

In FIGS. 16-20, spiral member 17 can be inserted in opening 28 in center member 11 and secured to center member 11 by welding or with a sleeve. Spiral member 17 can be welded to center member 11 at attachment point 33 where spiral member 17 contacts the inner surface of center member 11, as seen in FIG. 20.

Figure 30:
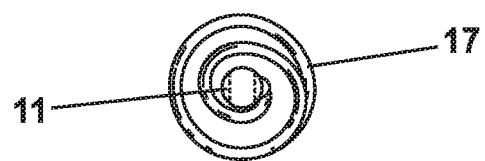
FIG. 30 is a top view of a tenth alternate embodiment of the apparatus of the present invention as shown in FIG. 29.
Figure 29:
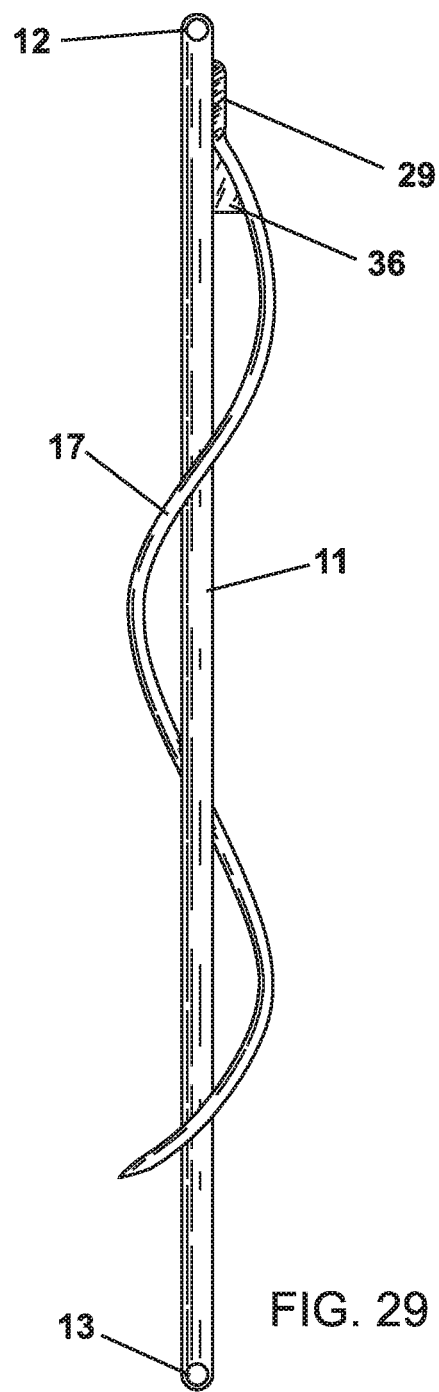
FIG. 29 is a side view of a tenth alternate embodiment of the apparatus of the present invention including a gusset.

Spiral member 17 can also be attached/supported on center member 11 by the following ways as seen in at least FIGS. 29-35, including but not limited to the following:

1. A gusset 36 can be used to support the intersection of central member 11 and spiral member 17, as seen in FIGS. 29, 30. A stainless or other metal gusset 36 can be welded in place or possibly a plastic, composite or other material brace can be put near the intersection to give additional support by being fitted and snapped in. Use of a gusset 36 may also help to prevent a fish from getting pinched into the tapering intersection.

2. The entire intersection of central 11 and spiral 17 members can be encapsulated in some liquefied metal or plastic 37 and allowed to harden in order to support that area, as seen in FIGS. 31, 32. This can provide additional support if long term durability is an issue.

3. A collar 38 can be used to support or construct the central 11 and spiral 17 member intersection, as seen in FIGS. 33-35. Set screws 39 can be used. A collar 38 can be made and fitted at the intersection for additional support. It can be made from stainless or other material and can include holes 40 bored for the central member 11 and spiral member 17 with set screws 39 to hold in place. Spiral member 17 can be secured in a straight or possibly an angled bore. The device can be constructed in three (3) pieces using such a collar.

4. A moving collar supporting spiral member 17 can be used. The same or similar collar 38 described above can be fitted and allowed or rotated to move up and down both members 11, 17. It can serve to preserve the integrity of the device 10 but may add a complexity that may not be of benefit in the execution of fish release. Unless constructed perfectly this addition would likely hang up without some slack or curve in the bore for the spiral member. It can be made of Teflon or similar material to allow free motion. The necessary bore would likely be costly to manufacture if possible at all.

Hollow Center Member

Figure 27:
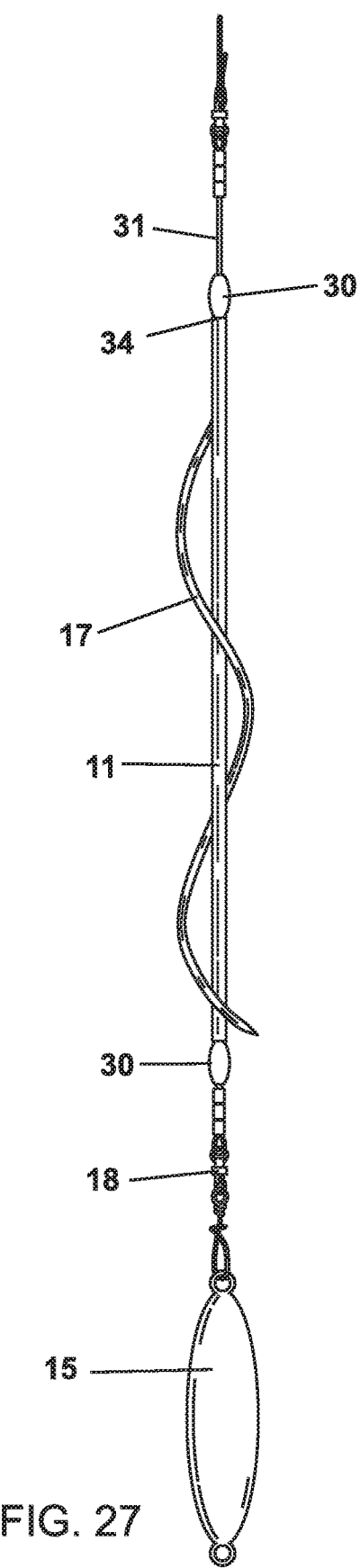
FIG. 27 is a side view of a ninth alternate embodiment of the apparatus of the present invention showing a line threaded through the center member, beads, and a first swivel attached to a weight and a second swivel attached to a line.
Figure 28:
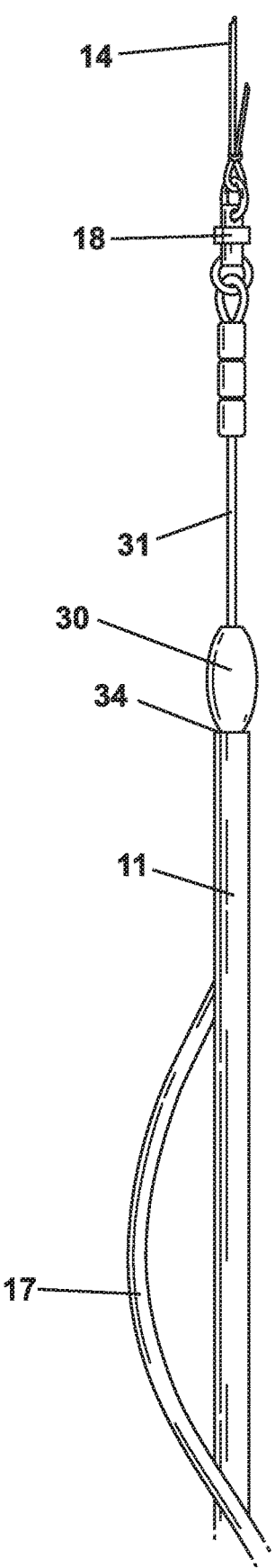
FIG. 28 is a detailed view of a ninth alternate embodiment of the apparatus of the present invention showing a line threaded through the center member, a bead, and a swivel attached to a fishing line.

In one embodiment, center member 11 can have a hole 34 bored completely through the main member center 11, as seen in FIGS. 27 and 28. A fishing line 31 can be attached to top swivel 18 and threaded through center member 11 hole 34, and then the same fishing line 31 can be attached to bottom swivel 18. Beads 30 can be placed on fishing line 31 at each end of the center member 11 (see for example FIG. 28) and can be used for spacing and chafe protection. Hole 34 replaces the need for eyes 12 and 13. Boring hole 34 or buying tubing as opposed to having a solid rod is significantly more expensive and possibly cost prohibitive, however, it does provide the user with more options that may work better with various fishing gear. It does still have the same function and result as the other embodiments of this invention.

Advantages:

This device has several advantages over other attempts made to accomplish the same task.

1. The present invention can return more than one fish 16 at a time with little chance of malfunction and could be built longer, if desired, to hold possibly any number of fish. This would be more suitable for commercial fishing interests. Deepwater fish are often caught several at a time.

2. The spiraled wire 17 of the present invention is an advantage as it is captured or held in place by the center wire member 11 as so not to bend or snag anything. This wire 17 going around the center member 11 several times over the length of the device 10 is a preferred embodiment of the design.

3. The present invention securely holds a fish 16 for return without complex mechanisms and will release fish at any depth. Some other devices only release upon hitting bottom which may be much deeper than the depth of catch. This is the case when fishing near oil rigs where depth can be thousands of feet. Still others have set depths based on pressure, which again may not correspond with catch depth.

4. The present invention can accommodate different sinker weight sizes as some fish will be more buoyant than others.

5. The present invention can be made of larger and stronger wire in order to accommodate larger fish. Deepwater fish can range from ounces to over 500 lbs. (226.8 kg).

6. The present invention can be connected to a fishing line with baited hooks above or below whereby the angler could release fish and also catch fish on the same drop with a minimum chance of malfunction. This maybe more suitable for commercial fishing interests.

7. The present invention is simple and durable enough to be affordable and practical, thereby making its use more likely by all anglers.

8. The device is more streamlined as opposed to bulky and descends very quickly.

9. The device holds fish with mouth forward and aerates gills, aids in swimming motion and rejuvenating the fish.

10. The device handles fish with greater trauma very effectively. At the surface they want to float while the device wants to sink thereby aiding the ability of the device to hold them. As the fish descend, compress and become less buoyant, separation is made much easier as it was designed to be.

11. Once the device is set in motion upward, natural release occurs and has little chance of malfunction.

12. The figures demonstrate the necessity of the encircling wire being "captured" around the center member. It allows it to hold weight and resist over stress while at the same time being flexible enough as so not to hinder release. It is essentially floating around the center member. It also does not need to be a uniform spiral and can be bent and reshaped very easily if damaged.

13. The device could be made more complex, possibly with replaceable parts, but simple and inexpensive will probably be the best option. So far, testing has been perfect, as well as sending cameras down to show the function.

One very important fact to consider as any release devices are put to use is the notion that you are sending potential food back down to other fishes and at any point the whole device and fishes for release could very easily be eaten whole or thrashed and destroyed by any number of species.

PARTS LIST

The following is a list of parts and materials suitable for use in the present invention:

| Parts Number | Description |
| --- | --- |
| 10 | fish release apparatus |
| 11 | center member |
| 12 | eye/eyelet/hole |
| 13 | eye/eyelet/hole |
| 14 | fishing line |
| 15 | weight |
| 16 | fish |
| 17 | spiral member |
| 18 | swivels |
| 19 | axis |
| 20 | top portion |
| 21 | bottom portion |
| 22 | turns |
| 23 | screw |
| 24 | hole |
| 25 | hole |
| 26 | opening |
| 27 | opening |
| 28 | opening |
| 29 | welded joint |
| 30 | bead |
| 31 | line |
| 32 | attachment point |
| 33 | attachment point |
| 34 | hole |
| 35 | jaw |
| 36 | gusset |
| 37 | liquified metal or plastic |
| 38 | collar |
| 39 | screw |
| 40 | hole |
| 41 | free end |
| 42 | connection |

All measurements disclosed herein are at standard temperature and pressure, at sea level on Earth, unless indicated otherwise.

The foregoing embodiments are presented by way of example only; the scope of the present invention is to be limited only by the following claims.

The invention claimed is:

1. An apparatus for releasing fish into deep water, comprising:
   a) a body having upper and lower end portions, a central longitudinal axis defined therebetween, and a first member being positioned along the central longitudinal axis, wherein the upper end portion includes a line connection portion;
   b) a second member immovably fixed to the first member at a connection at the upper end portion of said body and below the line connection portion in order to retain one or more fish below said line connection portion, wherein the second member has a free end portion spaced below said connection and a helical shape having a series of one or more continuous spaced-apart revolutions positioned about and spaced radially from the central longitudinal axis, each of said one or more revolutions having a length that extends along the central longitudinal axis, said second member configured to selectively hold one or more fish upwardly from the free end portion and in between a second member upper end portion and the free end portion, and release downwardly the one or more fish via said free end portion;

c) wherein the second member is spaced radially away from the body between the connection and the free end portion so that the one or more fish are able to move vertically in an upward or downward direction on the second member between the connection and the free end portion; and d) wherein the first member has a hole through a length of the first member.

2. The apparatus for releasing fish of claim 1, wherein a line is threaded through the hole allowing apparatus rotation about the line, and wherein one or more beads are attached to the line at a position next to the first member regulating vertical movement of the first member along the line.

3. The apparatus for releasing fish of claim 1, wherein the second member is immovably fixed to the first member via a wrapped connection, a welded connection, a sleeve, a collar, a gusset, encapsulation in some liquefied metal or plastic, a bored connection, or a screw connection.

4. The apparatus for releasing fish of claim 1, further comprising a weight secured to the body lower end portion via the first member.

5. An apparatus for releasing fish into deep water, comprising:

a) a body having an upper end and a lower end, and a central longitudinal axis defined therebetween, and a central member having a length defined by the upper and lower ends and positioned along the central longitudinal axis, wherein the central member has an internal channel through the length of the central member, wherein the upper end includes a line attachment portion;

b) a spiral member having a spiral upper end that is immovably fixed to the central member at the upper end of the body in order to retain one or more fish below said line attachment portion of the body upper end, the spiral member having a spiral lower end that is a free end spaced radially away from the body, and wherein said spiral member is wound into one or more continuous, spaced revolutions and spaced radially away from the central member about the central longitudinal axis, each of said one or more revolutions having a length that extends along the central longitudinal axis, said spiral member configured to hold the one or more fish upwardly from said free end and in between the spiral upper end and the spiral lower end and release the one or more fish downwardly off of the free end, wherein vertical travel of each of the one or more fish in an upward or downward direction is enabled between the spiral upper end and the free end; and c) a weight secured to the body lower end via the central member.

6. The apparatus for releasing fish of claim 5, wherein a line is threaded through the internal channel allowing apparatus rotation about the line, and wherein one or more beads are attached to the line to regulate vertical movement of the central member along the line.

7. The apparatus for releasing fish of claim 5, wherein the spiral member is configured to hold multiple fish.

8. The apparatus for releasing fish of claim 5, wherein the central member has a greater diameter than a diameter of the spiral member.

9. The apparatus for releasing fish of claim 5, wherein the central member and the spiral member are capable of rotating about said central longitudinal axis.

10. The apparatus for releasing fish of claim 5, further comprising one or more swivels, wherein one of said one or more swivels positioned at or near the body upper end and another of said one or more swivels positioned at or near the body lower end.

11. A device for releasing fish having a buoyancy into deep water, comprising:

a) a body having an upper end and a lower end, a central longitudinal axis defined therebetween, and a central member having a length defined by the upper and lower ends and a hole bored completely through the length of the central member, and wherein the upper end includes a line securing portion;

b) a spiral member having a spiral upper end that is immovably fixed to the central member at the upper end of the body and below said line securing portion, and said spiral member having a free end and a series of one or more continuous spaced-apart revolutions positioned about and spaced radially from the central longitudinal axis, each of said revolutions having a length that extends along the central longitudinal axis, said spiral member configured to selectively hold one or more fish upwardly from the free end and in between the spiral upper end and the free end and release downwardly off of said free end the one or more fish, wherein vertical travel of each of the one or more fish in an upward or downward direction is enabled between the spiral upper end and the free end; and c) a weight secured to the body lower end via the central member that overcomes the buoyancy of the one or more fish held by the spiral member.

12. The device of claim 11, wherein a line is threaded through the hole allowing device rotation about the line, and wherein one or more beads are attached to the line at a position next to the central member.

13. The device of claim 11, wherein the spiral member is immovably fixed to the central member via a wrapped connection a welded connection, a sleeve, a collar, a gusset, encapsulation in some liquefied metal or plastic, a bored connection, or a screw connection.

14. The device of claim 11, wherein the spiral member is configured to hold multiple fish.

15. The device of claim 11, wherein the central member has a greater diameter than a diameter of the spiral member.

* * * * *